E. BRINKMANN.
FILM CARRIER.
APPLICATION FILED JAN. 23, 1911.
1,034,967.
Patented Aug. 6, 1912.
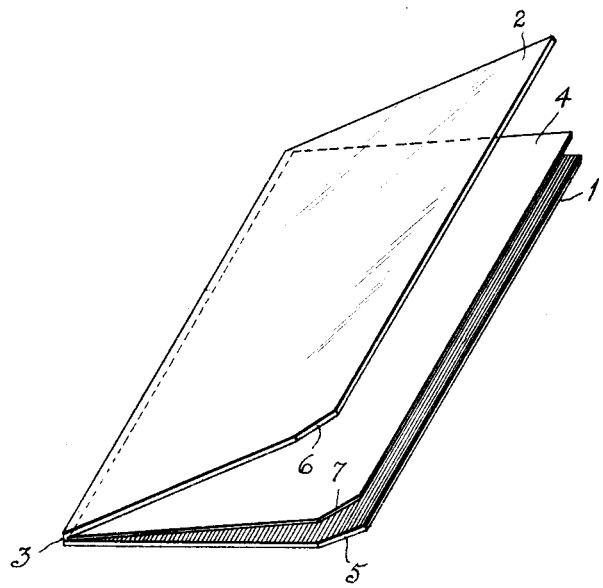
Witnesses:
Inventor
Ernst Brinkmann
by his attorneys

UNITED STATES PATENT OFFICE.

ERNST BRINKMANN, OF STEGLITZ-BERLIN, GERMANY.

FILM-CARRIER.

1,034,967. Specification of Letters Patent. Patented Aug. 6, 1912.

Application filed January 23, 1911. Serial No. 604,020.

*To all whom it may concern:*

Be it known that I, ERNST BRINKMANN, a subject of the German Emperor, and residing at Steglitz-Berlin, Germany, have invented certain new and useful Improvements in Film-Carriers, of which the following is a specification.

This invention relates to film carriers and the like, and is particularly adapted for use in color photography.

In its preferred form the carrier is designed to receive plates, films, papers, or the like, upon which photographic impressions may be made in natural colors; a single exposure producing the picture on a glass plate or film in several colors, as in the Lumiére process. In processes of this kind it is necessary to keep out certain light rays, and to that end a colored filter, preferably yellow, is used. Heretofore it has been customary in work of this character to hold such a plate in front of the objective, a troublesome operation, and one which the novel film carrier herein described is intended to do away with.

In the drawings which form a part hereof I have exemplified a preferred form of carrier.

This film carrier is equipped with a light-safe back-wall 1, and with a ray absorbing translucent or transparent front wall 2, the latter being preferably of yellow glass. The back wall 1 may be of cardboard or any suitable material and while the front wall 2 is preferably of glass, owing to the relative inflexibility of this material, I do not wish to be limited thereto. These walls are flexibly joined together at 3 in any suitable manner, so as virtually to form a booklet when the film 4 is introduced therebetween. The film, of course, may be slipped into or out of the carrier as desired; and when in place therein may be placed in position in the camera with a minimum of effort; the carrier which serves to laterally support the film preventing it from curling, while also providing not only a light-proof back, but a ray filter in front of the film.

The films used in the carrier to which the present invention more particularly relates, are of great sensitiveness, and when placing them into the carrier it is necessary that not even red light should strike them; hence they must in practice be placed in their carriers in perfect darkness. Further, the carrier with the film in place must also be placed in the camera in darkness, so that the sense of touch must be relied upon exclusively to insure proper emplacement of a film in its carrier and of a carrier together with its film in the camera. To this end one corner 5 of the back-wall 1 is clipped, as is also the corresponding corner 6 of the front wall; and that of the film, designated 7. The clipped corner of the film is alined by the finger tip with those of the front and back walls, the sensitized side of the film preferably facing the glass cover or plate 2. Thus by the sense of touch alone the operator can always thereafter locate the top or bottom of an undeveloped but exposed film. Correspondingly, the clipped corners 5, 6, 7, aid in properly placing the film and its carrier in the camera. Clipping the corners of the several parts, therefore, in the manner described not only affords an extremely convenient and reliable means of locating said parts by the sense of touch; but is further about as inexpensive an indicating means of this character as can be devised.

The picture is taken in the usual manner and it is not necessary to hold up a yellow plate before the objective; the operator hence having both hands free to manipulate his camera. The film itself being covered by the colored plate, at exposure the undesirable rays of light are excluded from the film, being absorbed by said plate. It will hence be seen that the invention while simple has merit.

By the term plate as used in the appended claims, it is intended that true plates only shall be included thereunder, in contradistinction to long strips.

What I claim, is:

1. A carrier for sensitized films, plates, papers and the like, which comprises a substantially opaque back plate, and a light transmitting front plate, the latter being colored to absorb objectionable rays, said front and back plates being joined to each other along one edge and together constituting a book-shaped holder adapted to contain and maintain substantially flat a sensitized film, said carrier having indicating means, appreciable to the sense of touch, for aiding in properly emplacing said carrier in a camera regardless of the absence of light.

2. A carrier for sensitized films, plates, papers and the like, which comprises a substantially opaque back plate, and a light transmitting front plate, the latter being colored to absorb objectionable rays, said front and back plates being joined to each other along one edge and together constituting a book-shaped holder adapted to contain and maintain substantially flat a sensitized film, one of said plates, at least, having a corner thereof clipped appreciably to the sense of touch, for aiding in properly emplacing said carrier in a camera, regardless of the absence of light.

3. The combination of a film carrier comprising a substantially opaque back plate and a light transmitting front plate colored to absorb objectionable rays, said front and back plates being joined to each other along one edge and together constituting a book-shaped holder, with a sensitized film adapted to be placed in said holder and to be maintained substantially flat therein, said carrier and said film having one set of superposed corner parts thereof clipped appreciably to the sense of touch, for aiding in properly emplacing said film in said carrier and said carrier, together with said film, in a camera, regardless of the absence of light.

4. The combination of a film carrier comprising a substantially opaque back plate and a light transmitting front plate colored to absorb objectionable rays, said front and back plates being joined to each other along one edge and together constituting a book-shaped holder, with a sensitized film adapted to be placed in said holder and to be maintained substantially flat therein, said carrier and said film having one set of superposed corner parts thereof clipped appreciably to the sense of touch, for aiding in properly emplacing said film in said carrier and said carrier, together with said film, in a camera, regardless of the absence of light, substantially the entire surface of said film being exposed through said front plate.

In testimony whereof, I affix my signature in the presence of two witnesses.

ERNST BRINKMANN.

Witnesses:
 HENRY HASPER,
 WOLDEMAR HAUPT.